US008931033B2

(12) United States Patent
Esteve Balducci et al.

(10) Patent No.: US 8,931,033 B2
(45) Date of Patent: Jan. 6, 2015

(54) INTEGRATING POLICIES FROM A PLURALITY OF DISPARATE MANAGEMENT AGENTS

(75) Inventors: Juan V. Esteve Balducci, Sammamish, WA (US); Michael K. Higashi, Issaquah, WA (US); David Paul Limont, Seattle, WA (US); John Allen Atwood, Duvall, WA (US); Burhan Ateeq, Seattle, WA (US); Patrick Tousignant, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1119 days.

(21) Appl. No.: 12/334,232

(22) Filed: Dec. 12, 2008

(65) Prior Publication Data

US 2010/0154025 A1    Jun. 17, 2010

(51) Int. Cl.
*H04L 29/00* (2006.01)
*H04L 29/06* (2006.01)

(52) U.S. Cl.
CPC ..................................... *H04L 63/20* (2013.01)
USPC .......................................................... 726/1

(58) Field of Classification Search
USPC .......................................................... 726/1
See application file for complete search history.

(56) References Cited

U.S. PATENT DOCUMENTS

| 7,159,125 | B2  | 1/2007  | Beadles et al. ................ 713/193 |
| 7,171,441 | B2  | 1/2007  | Shiouchi et al. .............. 709/202 |
| 7,350,226 | B2  | 3/2008  | Moriconi et al. ................ 726/1 |
| 7,743,414 | B2* | 6/2010  | Pouliot ............................ 726/22 |
| 8,490,163 | B1* | 7/2013  | Harsell et al. ..................... 726/6 |
| 2003/0177389 | A1* | 9/2003  | Albert et al. .................. 713/201 |
| 2006/0085838 | A1  | 4/2006  | Samuelsson et al. ............. 726/1 |
| 2006/0242685 | A1  | 10/2006 | Heard et al. ....................... 726/3 |
| 2006/0277590 | A1  | 12/2006 | Limont et al. .................... 726/1 |
| 2007/0204324 | A1  | 8/2007  | Roberts et al. ................... 726/1 |
| 2007/0266422 | A1  | 11/2007 | Germano et al. ................. 726/1 |
| 2008/0072280 | A1* | 3/2008  | Tardo et al. ...................... 726/1 |
| 2009/0063665 | A1* | 3/2009  | Bagepalli et al. .............. 709/222 |

OTHER PUBLICATIONS

Hilt, V. et al., "Session Initiation Protocol (SIP) Session Policies—Document Format and Session-Independent Delivery Mechanism," draft—ietf—sipping—session-indep-policy-03; SIPPING Working Group Internet Draft, Expires Jan. 17, 2006. [Downloaded from Internet on Oct. 7, 2008] url: http://tools.ietf.org/html/draft-ietf-sipping-session-indep-policy-03.

* cited by examiner

*Primary Examiner* — Minh Dinh
(74) *Attorney, Agent, or Firm* — Louise Bowman; Jim Ross; Micky Minhas

(57) ABSTRACT

Described herein are embodiments for managing policies of a mobile device. In embodiments, a mobile device receives policy containers from a plurality of disparate management agents. Each policy container has one or more policies. Each policy corresponds to a particular category that governs various aspects of the device. The policies described herein may be device wide policies corresponding to various features on the device. The policies may also be data specific policies which dictate how data is stored on and transferred to and from the device. Once the policies are received, a determination is made as to which policy in each category is the most secure policy. The most secure policy for each category is merged to create a global policy that is applied to the mobile device.

19 Claims, 9 Drawing Sheets

INTEGRATING POLICIES FROM A PLURALITY OF DISPARATE MANAGEMENT AGENTS

BACKGROUND

Protecting digital networks and the data contained therein is typically governed by numerous digital policies that are pushed to computing devices on the networks. These policies have been extended to mobile computing devices. Each mobile device is managed by a single management agent and users are restricted from utilizing their mobile device in environments managed by other disparate management agents. Users may also be restricted from downloading content provided by the disparate management agents. Current solutions require that an IT administrator establish a number of trusted links among each of the disparate management agents. However, this solution does not scale beyond a small number of management agents and is not user initiated.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described herein are embodiments for managing policies of a mobile device. In embodiments, a mobile device receives policy containers from a plurality of disparate management agents. Each policy container has one or more policies. Each policy corresponds to a particular category that governs various aspects of the device. The policies described herein may be device wide policies corresponding to various features on the device. The policies may also be data specific policies which dictate how data is stored on and transferred to and from the device. Once the policies are received, a determination is made as to which policy in each category is the most secure policy. The most secure policy for each category is merged to create a global policy that is applied to the mobile device.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Embodiments of the present disclosure may be more readily described by reference to the accompanying drawings in which like numbers refer to like items and in which.

DETAILED DESCRIPTION

Various embodiments are described more fully below with reference to the accompanying drawings, which form a part hereof, and which show specific embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects.

Figure 1:
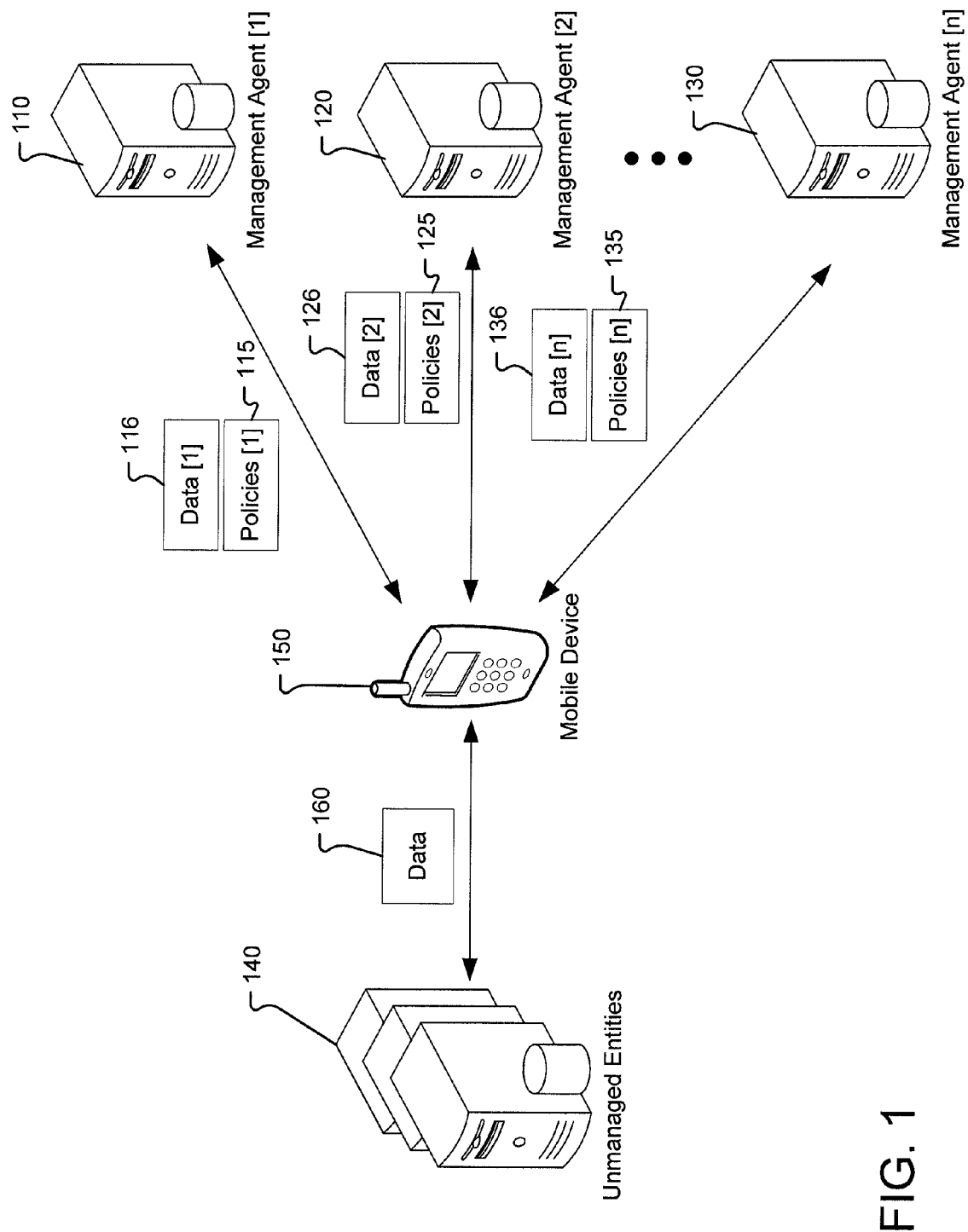
FIG. 1 illustrates an embodiment of a mobile device receiving policies and data from a plurality of disparate management agents.

FIG. 1 illustrates a distributed system with a plurality of management agents (management agent [1] 110, management agent [2] 120, and management agent [n] 130) connected to a mobile device 150 through a network. In embodiments, the management agents are exchange servers. Each exchange server may have one or more corresponding policies. In other embodiments, the management agents may be system management servers, third party servers, or any combination thereof.

Although only three management agents are shown, it is contemplated that the mobile device 150 may connect to any number of management agents. In embodiments, the mobile device 150 may be a smart phone, cell phone, personal digital assistant (PDA), or other handheld device capable of connecting to a network. Each of the plurality of management agents provides policies 115, 125, 135 and data 116, 126, 136 to the mobile device 150. These policies govern the properties of the mobile device 150 including the functionality of various components of the device (e.g., camera, smart card reader, etc.). The policies also govern how data is stored on and transferred to and from the device.

Mobile device 150 may also receive data from one or more unmanaged entities 140. In contrast to the management agents, the unmanaged entities do not require that the mobile device 150 adheres to any of the various policies. According to embodiments, the mobile device 150 is connected to both an unmanaged entity and management agent. If however, any one of the unmanaged entities are associated with one of the management agents that issued a policy that policy may still be applied on data received from the unmanaged entity.

Prior to receiving the data from any one of the management agents 110, 120, 130, the mobile device 150 may establish a relationship with, and download one or more policies from each management agent. Alternatively, the mobile device 150 may already have an established relationship with one management agent, such as management agent 110. Management agent 110 may update or change its policy. In response to the update, mobile device 150 may download the updated policy from the management agent 110 and the new policy may be applied to the mobile device 150.

In embodiments, once the policies of the management agent or server have been downloaded, the mobile device 150 receives a temporary policy key. The policy key indicates to the plurality of management agents that the policies issued by each management agent will be enforced on the mobile device 150.

According to embodiments, each management agent transmits a policy container having one or more policies to the mobile device 150. In embodiments the policy container is a set of policies issued by a management agent. Each policy in the policy set governs specific aspects of the device. Each policy corresponds to a specific category that relates to various features and aspects of the mobile device 150. For example, the categories may include: a Personal Identification Number (PIN) lock category having policies that require the mobile device to automatically lock itself after a specific amount of inactivity; a PIN length category having policies that require that a password for the device has a certain number of characters; a Bluetooth enablement category having policies that either enable or disable the Bluetooth capabilities of the mobile device 150; and a maximum number of emails category having policies that set a maximum number of email messages that may be stored on the mobile device 150. Although specific categories have been mentioned, it is contemplated that many more categories relating to the controls and management of the device may be included.

For example, the mobile device 150 may receive a policy container having two policies from management agent [1] 110, a second policy container having three policies from management agent [2] 120, and a third policy container having two policies from management agent [n] 130. Each policy in each of the policy containers received from the management agent may be associated with a separate category. Alternatively, a management agent may issue at least one policy that belongs in the same category as a policy issued by at least one other management agent. For example, management agent [1] 110 may issue a policy container that includes a PIN Lock policy and a password length policy. Management agent [2] 120 may issue a policy container having a PIN lock policy, a password length policy, and a policy that prohibits email attachments from being received on the mobile device 150. Yet another management agent, management agent [n] 130 may issue a policy container that contains an email encryption policy, requiring all email messages sent to and from the mobile device 150 to be encrypted, and a disable Bluetooth policy.

As previously discussed, each of the policies, including those listed above, may be either device wide policies or data specific policies. The device wide policies are policies that may be merged with all other device wide policies issued from each of the management agents. The data specific policies are policies which may, in some embodiments, be merged with other data specific policies and/or may be merged with the device wide policies. The data specific policies govern each account (e.g., various email accounts associated with each management agent or unmanaged entity) associated with the device. Data specific policies also govern how data is transferred to and from the device and how the data is stored on the device. For example, a data specific policy may require that only encrypted data may be sent to and from the mobile device 150. A data specific policy may also require that HTML mail be either enabled or disabled on the mobile device 150. The data specific policies may also correspond to secure Multipurpose Internet Mail Extension (SMIME) settings as well and truncation and filtering of data.

Once all policy containers from each of the plurality management agents are received, or when a new policy container from a new management agent has been received, the policies in each category are compared with the other policies in the same category to determine which policy is the most secure. When the most secure policy of each category has been determined, each of the most secure policies are merged to create a global policy. Therefore, the resulting global policy is at least as secure as any of the individual policies from each management agent. In embodiments, it does not matter which management agent issued each of the most secure policies in each category or whether each management agent is the same type of server (e.g. exchange server). Once the global policy has been created, the global policy is applied to the mobile device 150 when the mobile device 150 connects to each of the various management agents.

Figure 2:
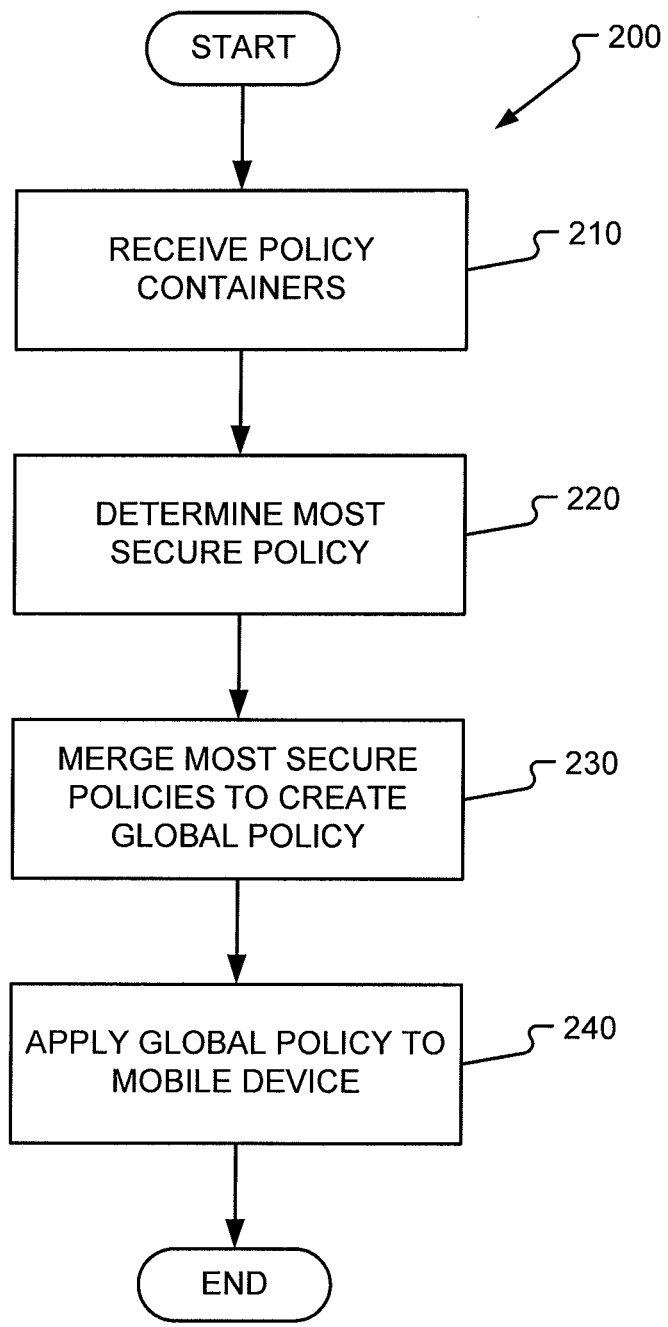
FIG. 2 is an operational flow for managing policies of a mobile device.
Figure 3:
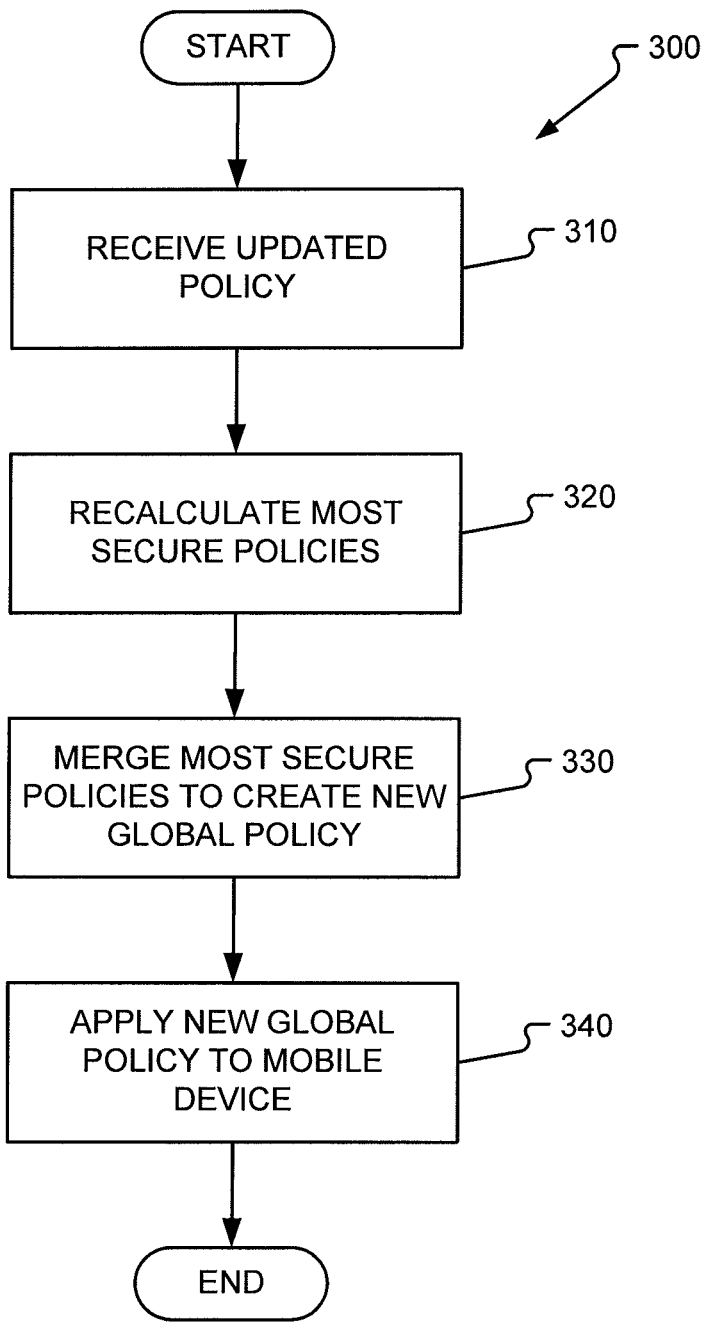
FIG. 3 is an operational flow for performing updates to the management policies of the mobile device.

FIGS. 2-3 illustrate operational flows 200 and 300 for managing policies of a mobile device according to embodiments. Operational flows 200 and 300 may be performed in any suitable computing environment. For example, the operational flows may be executed by systems such as the system described in FIG. 1. Therefore, the description of operational flows 200 and 300 may refer to at least one of the components of FIG. 1. However, any such reference to components of FIG. 1 are for descriptive purposes only.

Operational flow 200 begins at Step 210 in which policy containers are received by the mobile device 150 (FIG. 1). The policy containers may contain one or more policies. Each of the one or more policies may govern a specific aspect of the device or govern data management aspects of the device. In an embodiment, each policy corresponds to one of a plurality of categories. Such examples include a PIN lock category, a password length category, etc.

Once the policy containers have been received by the mobile device, step 220 provides that each policy in each category is compared with all other policies in the same category, to find the most secure policy in each category (e.g. a password length category). In embodiments, this comparison is performed on each policy of each category regardless of which management agent provided the policy. For example, if management agent [1] 110 has a policy requiring that the mobile device 150 have a password with a minimum character length of four, and management agent [2] 120 has a policy requiring the mobile device 150 to have a password with a minimum length of five, these two policies are compared to determine which policy is the most secure. Because a password having five characters is more secure than a password having four characters, the policy requiring the password of five characters will be the policy that is enforced on the mobile device 150.

It is also contemplated that a management agent may issue a policy type that the other management agents in the system did not issue. For example, management agent [n] 130 may have issued a policy that requires the mobile device 150 to disable Bluetooth capabilities. In embodiments, it may be determined that disabling Bluetooth capabilities of the mobile device 150 is more secure than allowing the Bluetooth capabilities to be enabled. Thus, the Bluetooth policy will be determined to be the most secure in the Bluetooth policy category and the policy will be applied to the mobile device 150. Even though management agent [n] 130 is the only management agent requiring that this policy be enforced, this policy will be globally enforced because it is determined to be the most secure.

Once the most secure policy from each category has been determined, step 230 provides that the policies are merged together to create an aggregate list or global policy. In embodiments, the global policy may contain one or more policies from each of the plurality of management agents. Alternatively, one management agent may have issued the most secure policy for each category. In such instances, the policies issued by this particular management agent will be enforced when the mobile device connects to each of the other management agents.

According to embodiments, there are a number of different merging rules that may be applied when creating the global policy. Each of these rules may be applied when device wide policies are merged, when data specific policies are merged, or when a combination of device wide and data specific policies are merged. A few examples of merging rules are described below. However, it should be appreciated that the present disclosure is not limited to the specific rules described below and other embodiments may include different merging rules not described below. In some embodiments, a number of, or combination of, individual merging rules may be applied.

One merging rule is a binary merging rule. According to the binary merging rule, an enablement bit is set which overrides any off bit of a policy or, the inexistence of a policy. For example, if management agent [1] 110 requires that the mobile device 150 be PIN locked after a specified time of inactivity and second management agent [2] 120 did not issue a similar policy, the policy from management agent [1] 110 is determined to be the most secure policy in that particular category (e.g. the PIN lock category). Thus, regardless of whether the mobile device 150 connects to management agent [1] 110 or management agent [2] 120, if the device is inactive for the amount of time specified in the PIN lock policy, the device will automatically lock.

A second merging rule is an integer merging rule. According to the integer merging rule, if the policies are enumerated from least secure to most secure, or vice versa, the policy with the most secure setting will trump the other policies. An example of this rule is a password length policy. For example, if a policy issued from management agent [1] 110 requires a password length of four and a policy issued from management agent [2] 120 requires a password length of five, the policy requiring the longer password would trump the policy that requires fewer numbers. Therefore, the policy requiring a password length of 5 would be the policy that is enforced. In contrast, in data specific policies, the smallest number may be determined to be the most secure policy. For example, management agent [1] 110 may issue a policy that limits the number of email messages stored on the device to a specific number (e.g., 25). Management agent [2] 120 may issue a policy that permits thirty email messages to be stored on the mobile device 150. In embodiments, the policy that allows the smallest number of messages to be stored on the device, namely the policy issued from management agent [1] 110, is determined to be the most secure policy.

A third rule for policy merging is the allow sets rule. According to this rule, the policies set forth by the management agents enumerate a list of actions, programs, or procedures that are allowed to be executed on the mobile device 150. When policies are merged using this rule, the global policy will consist of the intersection of the various individual policies. For example, if management agent [1] 110 allows programs A, B, and C to run while management agent [2] 120 allows programs B, C, and D to be run, the resulting intersecting set would allow only programs B and C to be run on the mobile device 150.

A fourth rule of policy merging is the restriction sets rule. According to this rule, the policies set forth by the management agents enumerate a list of actions, programs or procedures that are not allowed to be executed on the device. When the policies are merged, the resulting global policy will consist of the union of the various individual policies. Therefore, if management agent [1] 110 does not allow execution of programs A and B and management agent [2] does not allow execution of programs B and C, the global policy will not allow execution of programs A, B and C on the mobile device 150.

Once the policies have been merged according to one or more rules listed above, step 240 provides that the global policy is applied to the device. As indicated above, the policies may be device wide policies, such as PIN lock, camera controls, etc. while other policies may be data specific policies. According to embodiments, the device wide policies may be merged and the resulting global policy applied to the device when connecting to each one of the plurality of management agents. For example, when the mobile device 150 connects to any of the management agents, the most secure policy from each category issued by management agent [1] 110, management agent [2] 120, and management agent [n] 130 is applied to the mobile device 150.

However, data specific policies need not always be merged. In some embodiments, the data specific policies are merged and the resulting global policy applied to all accounts. Alternatively, in other embodiments, the merge rules are not applied to the various data specific policies and each data specific data policy is enforced only when the mobile device 150 connects to the management agent that issued the specific data policy.

In embodiments, the global policy may contain a combination of device wide policies and data specific policies. While the device wide policies are applied on the device regardless of which management agent the mobile device 150 is currently connected to, a subset of data specific policies may be enforced only when the mobile device is connected to the management agent that issued the subset of the data specific policies. In other embodiments, data specific policies may be applied continuously to any data stored on the device, regardless of whether the data that was retrieved from the network (e.g., servers, computers or other storage devices) associated with the given management agent.

FIG. 3 is an operational 300 flow for performing updates to the management policies of the mobile device according to embodiments. Flow 300 may be implemented when a relationship between a management agent and the mobile device is severed, when a new relationship between the mobile device 150 and a new management agent begins, when a relationship between the mobile device 150 and a management agent is renewed, or when one of the management agents updates, adds or deletes a policy in its policy container.

In step 310, an updated policy is received by the mobile device 150. The updated policy may result from an added policy, an updated policy or the exclusion of a policy (e.g., adding or removing a PIN lock policy or changing a password length policy). In other embodiments, the flow 300 may be trigged by one management agent severing a relationship with the mobile device 150. In yet other embodiments, the flow 300 may be triggered by the mobile device 150 severing a relationship with the management agent. When a relationship between a management agent and the mobile device 150 is severed, each policy provided by that particular management device is no longer applied by the mobile device 150.

Once it is determined that a policy has been updated or removed, step 320 provides that the most secure policy, for each category is recalculated. Thus, continuing with the example from above, management agent [1] 110 may change its password length policy to have a minimum length of six characters. Once the update is received, the mobile device 150 will compare the updated policy with all other policies in the same category to determine which policy is now the most secure. Because a policy requiring a six character password is more secure than a policy requiring a five character password, the policy requiring 6 characters is merged with the remaining most secure policies from the remaining categories.

According to an embodiment, the mobile device 150 may store data that identifies which management agent issued each of the policies. This provides a means whereby users can determine which policies are being enforced by each of the management agents. Thus, a user of the mobile device knows which policies will no longer be enforced when the relationship with a particular management agent is severed. This also allows the mobile device to more quickly determine what policies need to be rolled back, recalculated and merged to create a new global policy when a policy has been updated, added or removed.

In embodiments, when a relationship between the mobile device 150 and one of the management agents has been severed, the policies that were issued by the remaining management agents are compared and a new determination is made as to which policies are the most secure. As previously explained, the mobile device 150 may store data that indicates what policies are issued from each of the management agents. It can also be determined whether any of the policies issued by the management agent were classified as the most secure policy in any of the categories. In instances where none of the policies were determined to be the most secure, there is no need to recalculate the most secure policies in each category as they remain unchanged. However, in embodiments, it may be desirable to recalculate the security rating of each of the remaining policies. This ensures that the aggregate list of applicable policies is always up to date.

Once the most secure policy for each category have been recalculated, step 330 provides that the new set of most secure policies are merged together to create a new global policy. According to embodiments the policies are merged according to one or more of the merge rules (binary, integer, allow sets, and restriction sets) indicated above.

When the new global policy has been created, step 340 provides that the new global policy is applied to the mobile device 150. According to embodiments, the new global policy may contain both device wide policies and/or data specific policies. In embodiments, the device wide policies may be applied globally while the data specific may or may not require merging. In alternative embodiments the global policy may contain a combination of device wide and data specific policies. In other embodiments some of the data specific policies may require merging, while other data specific policies are only enforced when the mobile device connects to the management agent that issued the data specific policy. In yet other embodiments, data specific policies may not require a connection to the specific agent that issued them and the data specific policies may be applied continuously to any data stored on the mobile device 150 that was retrieved from the network (servers, computers or other storage devices) associated with the given management agent.

Figure 4A:
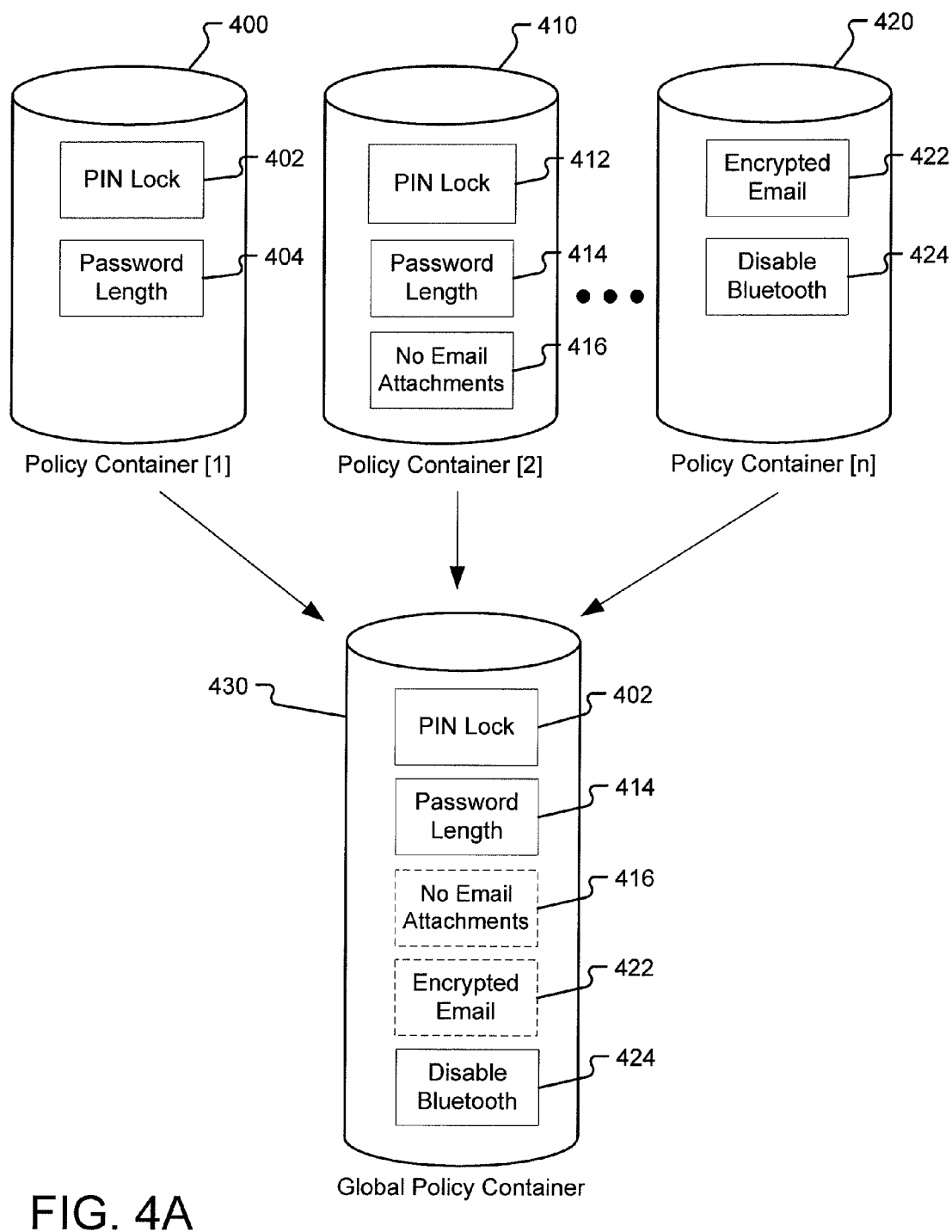
FIG. 4A illustrates the merging policies from a plurality of disparate management agents.
Figure 4B:
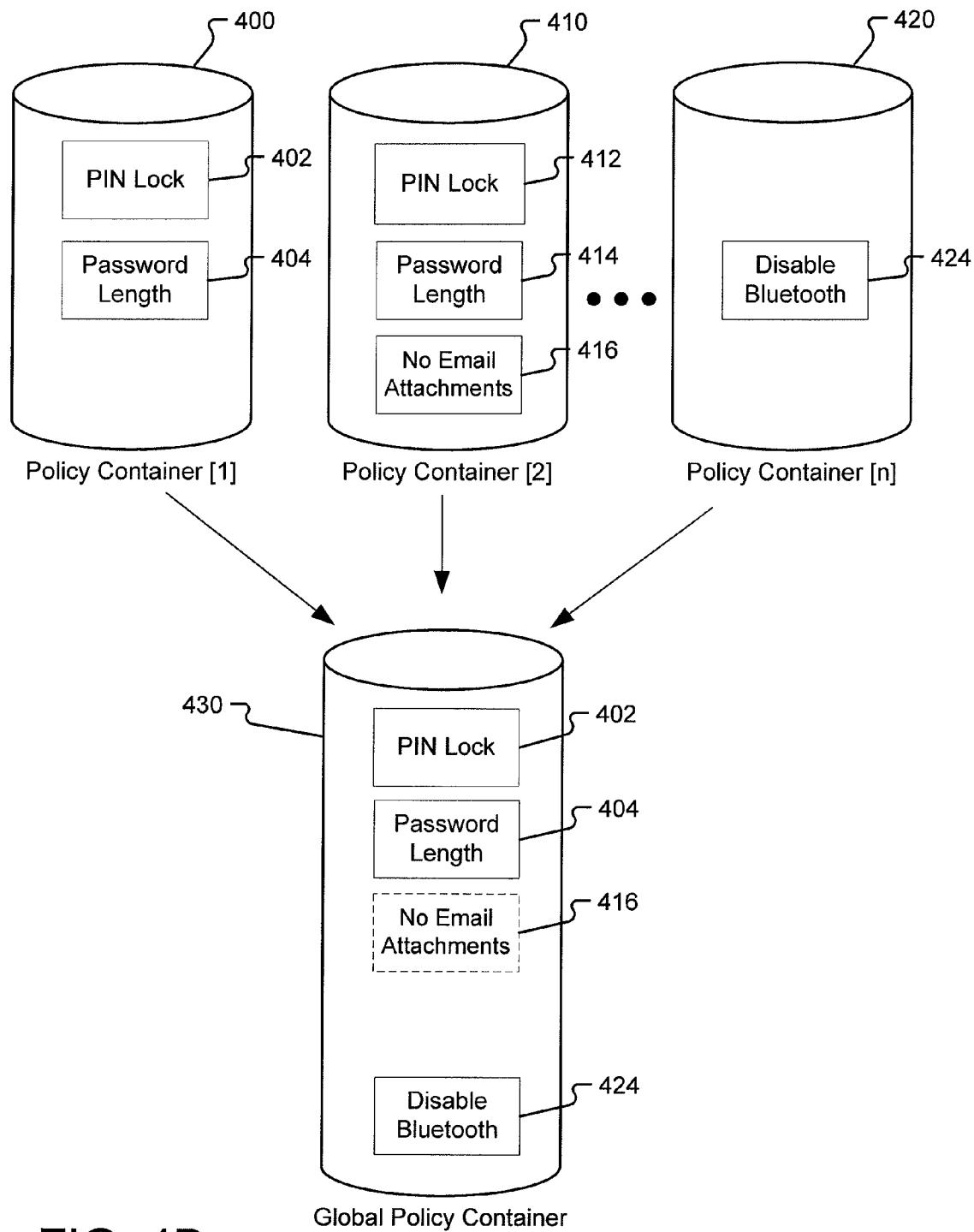
FIG. 4B illustrates merging updated policies from a plurality of disparate management agents.
Figure 4C:
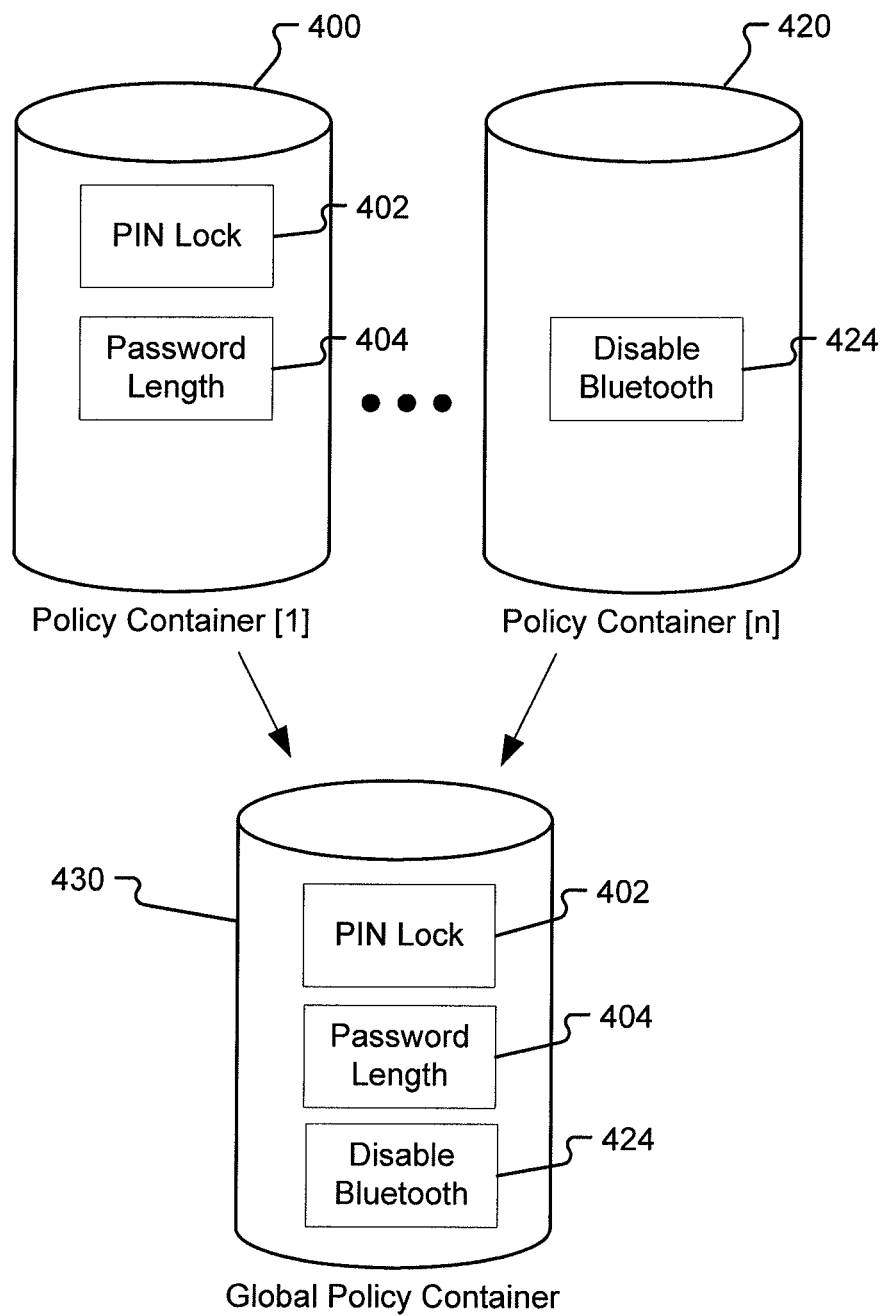
FIG. 4C illustrates merging updated policies from a plurality of disparate management agents when a relationship between the management agent and the mobile device has been severed.

FIG. 4A illustrates how policies from a plurality of disparate management agents are merged according to embodiments. The policies contained in each policy container 400, 410, and 420 may be merged using the one or more of the merging rules described above. Although the policies in FIG. 4A, as well as the policies illustrated in FIGS. 4B-4C are specific policies, it is to be understood that the policies listed in each of the policy containers are for illustrative purposes and are not limiting.

As illustrated in FIG. 4A, policy container [1] 400 may contain two policies: a PIN lock policy 402 and a password length policy 404. Policy container [2] 410 may contain 3 policies: a PIN lock policy 412, a password length policy 414, and a policy that restricts email attachments 416 from being received on the mobile device 150. Policy container [n] 420 may include two policies: an encrypted email policy 422 and a disable Bluetooth policy 424. Each policy container [1], [2], and [n] 400, 410, and 420 may be a policy container issued from management agent [1] 110, management agent [2] 120 and management agent [n] 130 respectively.

When the mobile device 150 receives each policy container and the corresponding policies, a determination is made as to which policy in each policy category is the most secure. For example, because policy container [1] 400 and policy container [2] 410 each have a PIN lock policy 402 and 412, and a password length policy 404 and 414, a determination is made as to which policies are the most secure with respect to these two categories.

In an embodiment, the PIN lock policy contained in policy container [1] 400 may require that the device be locked after 5 minutes of inactivity. The PIN lock policy contained in policy container [2] 410 may require that the device be locked after the device has been inactive for 10 minutes. Because automatically locking the device after 5 minutes of inactivity is more secure, the PIN lock policy 402 is included in the global policy container 430. In instances where neither policy is determined to be the most secure (e.g., both PIN lock policies have a maximum time of inactivity of 5 minutes) the policy that issued from the management agent with the first in time relationship may be the policy that is applied.

Continuing the example, the password length policy 404 may require a password of 4 characters while password length policy 414 may require a password of 6 characters. Using the integer rule explained above, password length policy 414 is determined to be the most secure policy. When the policies are subsequently merged, policy 414 will be included in the global policy container 430.

Policy container [2] 410 may also include a policy that restricts email attachments from being received on the device according to embodiments. Because none of the other policy containers have a similar policy, the binary rule determines that restricting email attachments is more secure than allowing email attachments. As a result, the no email attachments policy 416 is included in the global policy container 430. It should be noted that the no email attachments policy 416 may be a data specific policy and therefore, may be applied by the mobile device 150 regardless of which management agent the mobile device is connecting to. Alternatively, the policy may only applied when the device is connecting to the management agent, or servers and data sources associated with the management agent that issued the policy.

Still continuing with the example, policy container [n] 420 may include an encrypted email policy 422 and a disable Bluetooth policy 424. Using the merging rules above, and determining that policies 422 and 424 are the only policies in their respective categories, policies 422 and 424 are determined to be the most secure. When the policies are subsequently merged, policies 422 and 424 will be included in the global policy container 430.

As with the no email attachments policy 416, the encrypted email policy 422 may be a data specific policy. Therefore, the encrypted email policy 422 may be merged and applied globally to all management agents. In other embodiments, the encrypted email policy 422 is only applied when the mobile device 150 connects to the management agent that issued the policy or when the mobile device 150 connects to servers or other data sources that are associated with the management agent.

As a result of running the various merging rules, the global policy container 430 contains the most secure policy from each category.

FIG. 4B illustrates merging updated policies from a plurality of disparate management agents when a policy has been removed from a policy container. In this example, policy container [1] 400 and policy container [2] 410 have the same policies above with respect to FIG. 4A. However, management agent [n] 120 has removed the encrypted email policy 422 from the policy container [n] 420. As a result, the policies are rolled back, a new set of the most secure policies are determined, and the policies are merged based on the merge rules. Because the encrypted email policy 422 no longer exists, this particular policy is removed from the global policy container 430. Thus, email messages sent to and from the device 150 may no longer need to be encrypted.

Continuing with the example, management agent 100 may have updated the password length policy 404. The updated password length policy 404 may now require seven characters instead of four. As a result, the password length policy 404 is now the most secure policy. The password length policy 404 is then merged with the other remaining most secure policies (e.g., PIN lock 404, No Email attachments 416, and disable Bluetooth 424). According to embodiments, it may not be necessary to recalculate each of the most secure policies for each category. When a policy for a particular category is updated, the device may compare the updated policy value with the current most secure policy of that particular category. Based on the comparison, a determination is made as to whether the updated policy trumps the current most secure policy of the category. If the updated policy does not trump the current most secure policy, the global policy remains unchanged. If however, the updated policy trumps the current secure policy of the category, an update must be performed.

FIG. 4C illustrates merging policies from a plurality of disparate management agents when a relationship between the mobile device and a management agent has been severed. Continuing with the example from FIG. 4B, the relationship between management agent [2] 110 and the mobile device 150 has now been terminated. As a result, policy container [2] 410 along with its corresponding policies are no longer applied to the mobile device 150.

When the policies from the removed management agent are no longer being enforced on the mobile device 150, the remaining policies from each remaining policy container are rolled back and a new calculation is performed to determine which of the remaining policies, in each of the remaining categories, are the most secure. Continuing the example from above, because each of the remaining policies are in separate categories, applying the merging rules yields a global policy container 430 having the PIN lock policy 402, the password length policy 404 and the disable Bluetooth policy 424. Each of the remaining policies are device wide policies, and therefore, the policies are applied to the mobile device 150 regardless of whether the device is connecting to management agent [1] 100 or management agent [n] 130.

Figure 5:
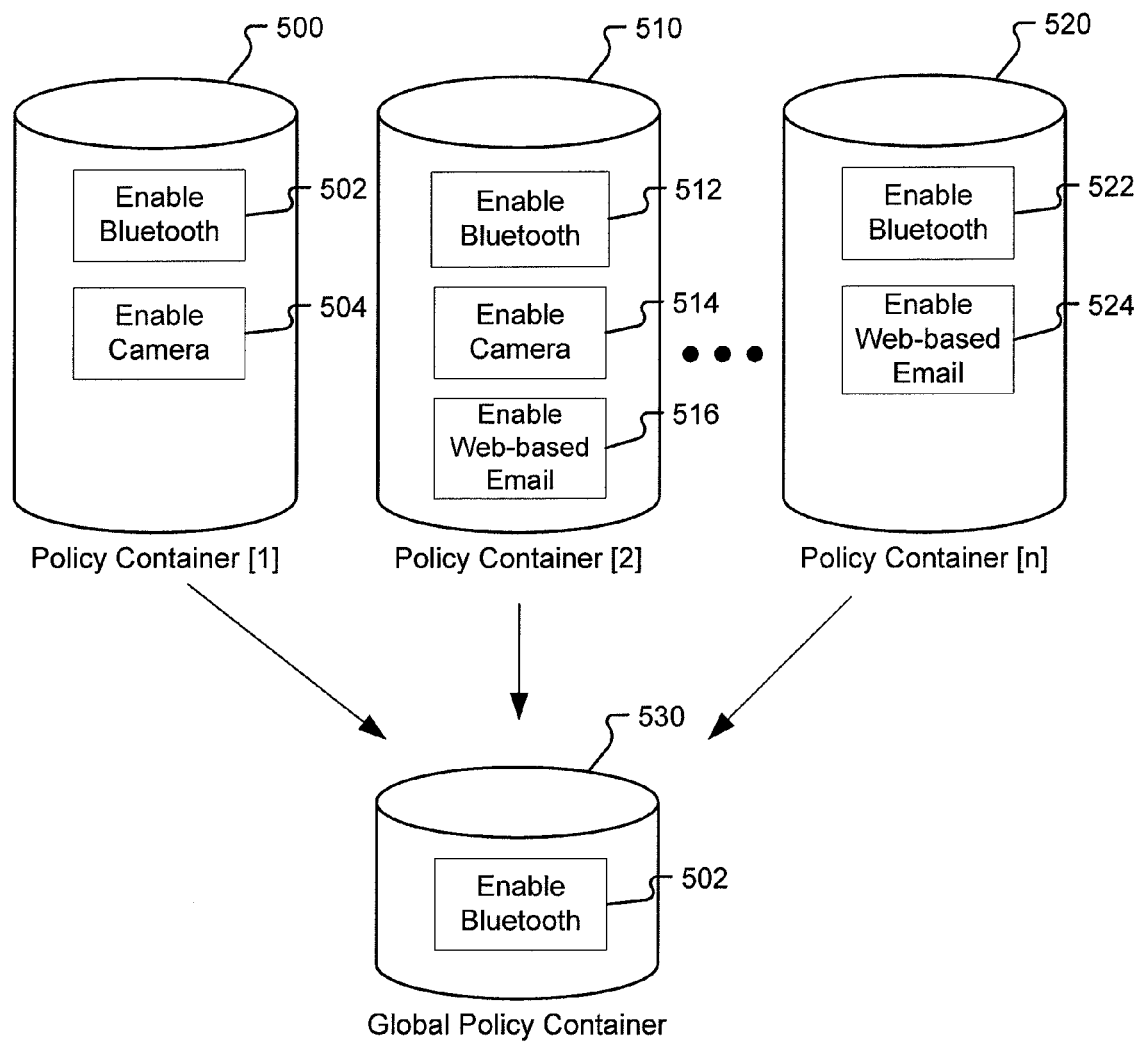
FIG. 5 illustrates a merging rule for merging policies from a plurality of disparate management agents.

FIG. 5 illustrates a merging rule for merging policies from a plurality of disparate management agents.

According to embodiments, the allow sets rule as explained above, allows actions, programs or procedures to be executed on the device so long as each management agent allows the action to be executed. For example, management agent [1] 110 may issue a policy container [1] 500 having policies which enable Bluetooth 502 and enable camera operations 504. Management agent [2] 120 may issue policy container [2] 510 which includes policies for enabling Bluetooth 512, enabling camera operations 514, and enabling web-based email programs 516. Management agent [n] 130 may issue policy container [n] having policies that enable Bluetooth 522 and enable web-based email 524. Applying the allow sets merge rule, the intersection of each individual policy is taken and the resulting global policy container 530 has a single policy—the enable Bluetooth policy 502. As a result, when the global policy 530 is applied to the mobile device 150, Bluetooth capabilities of the device will be enabled while other device functionalities (e.g., camera operations) are disabled.

Figure 6:
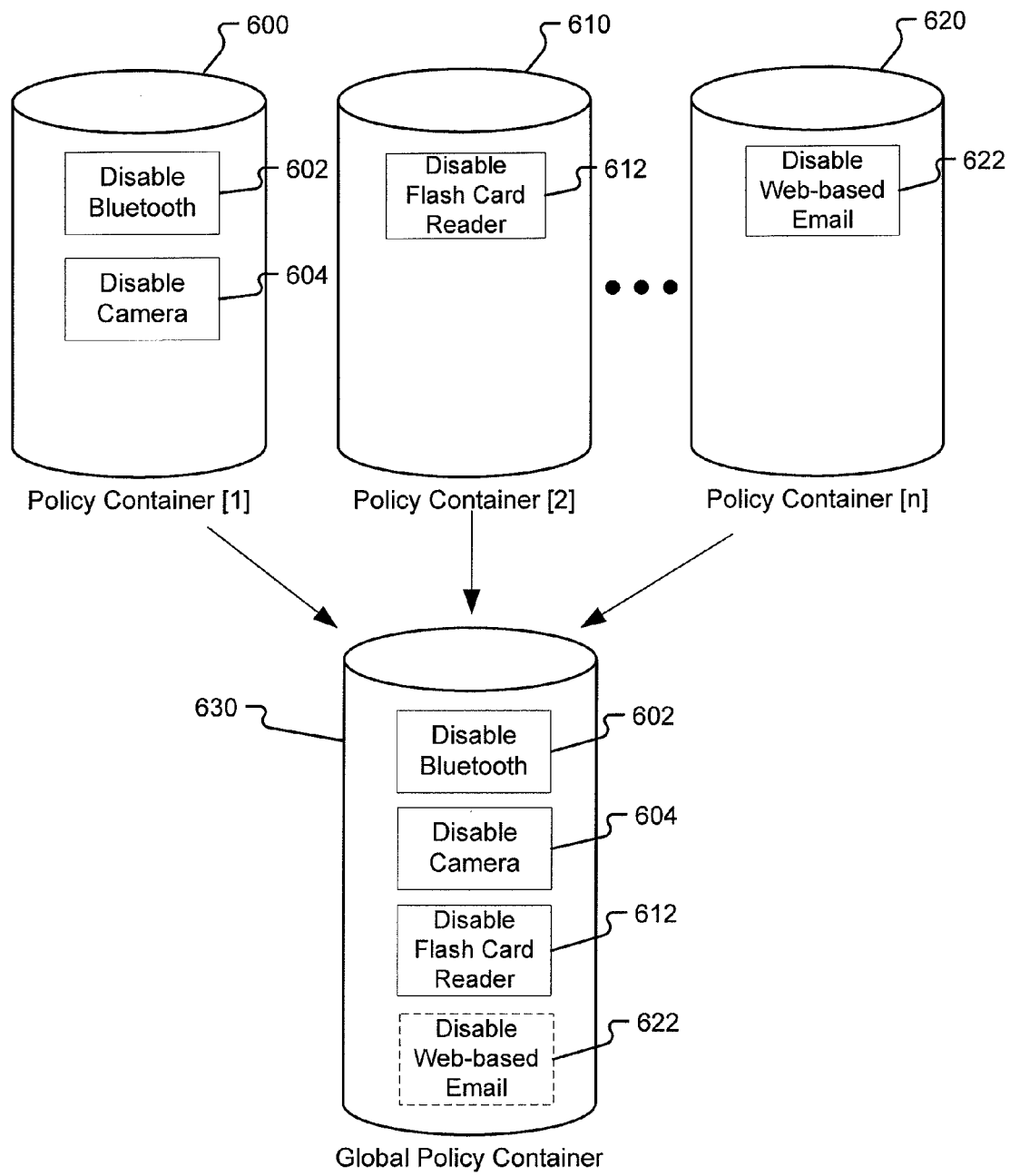
FIG. 6 illustrates a second merging rule for merging policies from a plurality of disparate management agents.

FIG. 6 illustrates another merging rule for merging policies from a plurality of disparate management agents.

According to embodiments, the restriction sets merging rule enumerates a list of actions, programs or procedures that are not allowed to be executed by the mobile device 150. When merging these types of policies, the resulting global policy container 630 includes an aggregate list of the union of the various individual policies. For example, management agent [1] 110 may issue policy container [1] 600 which includes a disable Bluetooth policy 602 and a disable camera operations policy 604. Management agent [2] 120 may issue policy container [2] 610 having a disable flash card reader policy 612. Management agent [n] 130 may issue policy container [n] 620 having a disable web-based email policy 622.

Performing a union on these policies yields a global policy container 630 that includes each of the policies listed above (e.g., policies 602, 604, 612 and 622). As a result, when the global policy 630 is applied to the mobile device 150, the device may not use the Bluetooth capabilities, the camera, or the flash card reader. According to embodiments, the disable web-based email policy 622 may be a data specific policy and depending on the implementation, may be applied globally or may only be applied when the device connects to management agent [n] 130. In other embodiments, the data specific policy may be applied to servers or data sources associated with management agent [n] 130.

Figure 7:
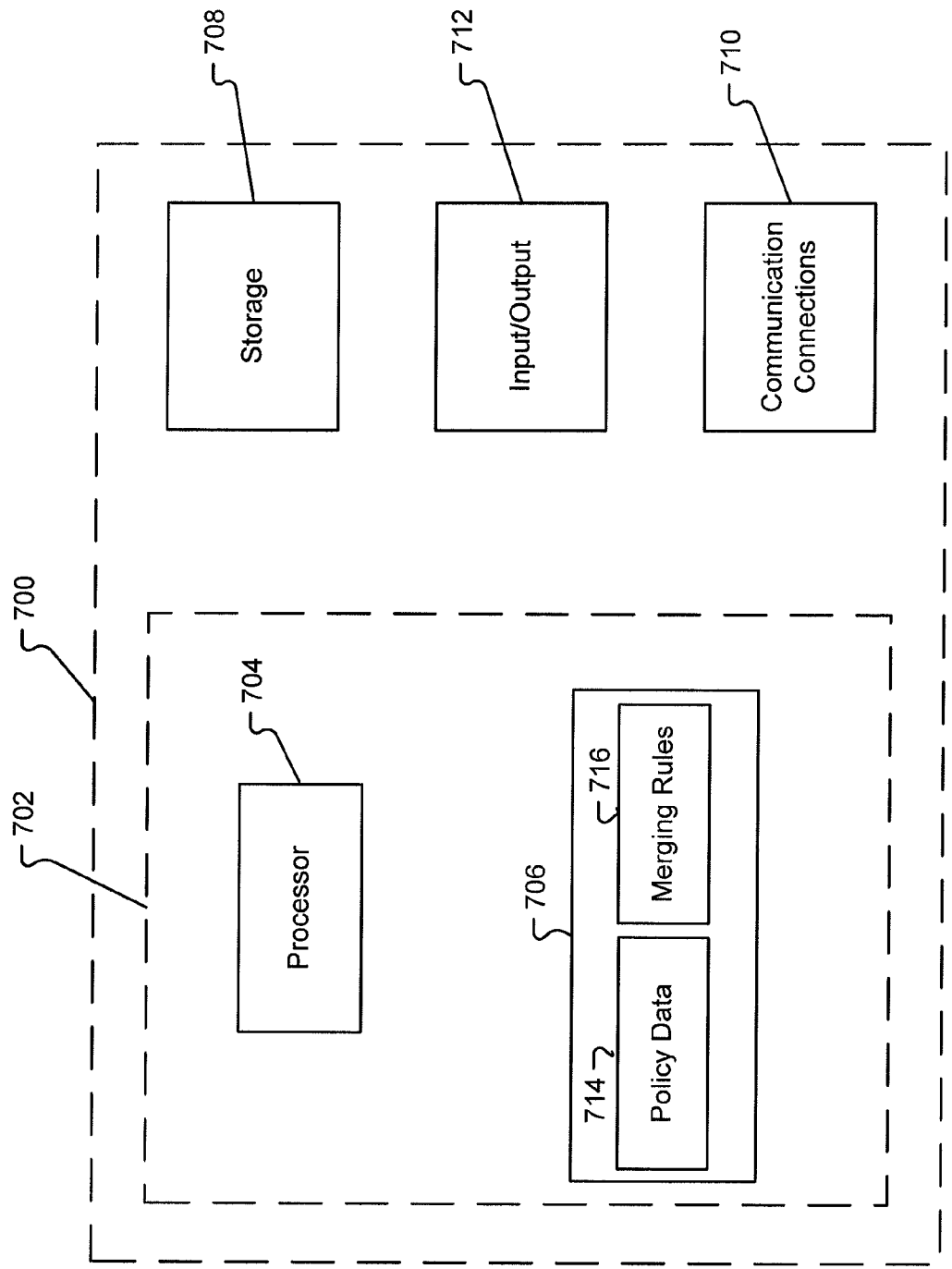
FIG. 7 illustrates a computing environment for implementing embodiments.

With reference to FIG. 7, an embodiment of a computing environment for implementing the various embodiments described herein includes a computer system, such as computer system 700. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 700 comprises at least one processing unit or processor 704 and system memory 706. The most basic configuration of the computer system 700 is illustrated in FIG. 7 by dashed line 702. In some embodiments, one or more components of the described system are loaded into system memory 706 and executed by the processing unit 704 from system memory 706. Depending on the exact configuration and type of computer system 700, system memory 706 may be volatile (such as RAM), non-volatile (such as ROM, flash memory, etc.), or some combination of the two.

Additionally, computer system 700 may also have additional features/functionality. For example, computer system 700 includes additional storage media 708, such as removable and/or non-removable storage, including, but not limited to, magnetic or optical disks or tape. In some embodiments, software or executable code and any data used for the described system is permanently stored in storage media 708. Storage media 708 includes volatile and non-volatile, removable and non-removable media implemented in any method or technology for storage of information such as computer readable instructions, data structures, program modules, or other data.

System memory 706 and storage media 708 are examples of computer storage media. Computer storage media includes RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 700 and processor 704. Any such computer storage media may be part of computer system 700. In embodiments, system memory 706 and/or storage media 708 stores data used to perform the methods or form the system(s) disclosed herein. In embodiments, system memory 706 stores information such as policy data 714 which indicates among other things, which management agent issued each policy and which policy in each category is the most secure policy. In embodiments system memory 706 also stores the merging rules 716.

Computer system 700 may also contain communications connection(s) 710 that allow the device to communicate with other devices. In embodiments, communications connection(s) 710 may be used to transmit and receive messages between sender devices, intermediary devices, and recipient devices. Communication connection(s) 710 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, the methods described above may be transmitted over the communication connection(s) 710.

In some embodiments, computer system 700 also includes input and output connections 712, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 712 are used to display the information as described herein. All these devices are well known in the art and need not be discussed at length here.

In some embodiments, the component described herein comprise such modules or instructions executable by computer system 700 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 700 is part of a network that stores data in remote storage media for use by the computer system 700.

This disclosure described some embodiments of the present disclosure with reference to the accompanying drawings, in which only some of the possible embodiments were shown. Other aspects may, however, be embodied in many different forms and should not be construed as limited to the embodiments or examples set forth herein. Rather, these embodiments and examples were provided so that this disclosure was thorough and complete and fully conveyed the scope of the possible embodiments to those skilled in the art.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present disclosure. Therefore, the specific structure, acts, or media are disclosed only as illustrative embodiments. The disclosure is defined by the appended claims.

What is claimed is:

1. A method for managing policies of a mobile device, the method comprising:
    receiving a plurality of policy containers from a plurality of management agents, wherein each of the plurality of policy containers has one or more policies and wherein each of the one or more policies corresponds to a category from a plurality of categories;
    for each category of the plurality of categories, determining which of the one or more policies is a most secure policy;
    merging the most secure policy from each category of the plurality of categories to create a global policy;
    applying the global policy to the mobile device; and
    automatically updating the global policy when at least one of the one or more policies corresponding to a first category of the plurality of categories is updated, further comprising: rolling back each of the one or more policies, recalculating a security rating for each of the one or more policies, determining which of the one or more policies is the most secure, merging the most secure policy corresponding to the first category with the most secure policies of the plurality of categories that were not updated to create a new global policy, and applying the new global policy to the mobile device.

2. The method of claim 1, wherein the one or more policies are device wide policies.

3. The method of claim 1, wherein the one or more policies are data specific policies.

4. The method of claim 1, further comprising automatically updating the global policy when a relationship between the mobile device and at least one of the plurality of management agents is severed.

5. The method of claim 4, wherein automatically updating comprises:
    excluding the one or more policies of the one of the plurality of management agents with which the relationship was severed;

determining which of the one or more policies remaining, after the excluding, for each category is the most secure; merging the most secure policy of the remaining policies from each category to create a new global policy; and applying the new global policy to the mobile device.

6. The method of claim 1, further comprising storing, on the device, data corresponding to which of the plurality management agents provided each of the plurality of policy containers.

7. The method of claim 1, wherein determining the most secure policy comprises evaluating a binary rule, wherein an enablement bit of the binary rule determines whether the policy with the enablement bit set is the most secure policy.

8. The method of claim 1, wherein determining the most secure policy comprises evaluating an integer rule, wherein the integer rule determines the most secure policy based on an enumeration of integer values associated with each of the one or more policies.

9. The method of claim 1, wherein merging the most secure policy from each category of the plurality of categories to create a global policy comprises:
    evaluating the one or more policies from each of the plurality of management agents to create a set of allowable actions corresponding to each of the plurality of management agents;
    intersecting each set of allowable actions to determine whether one or more specific actions from each set of actions is allowed by each of the plurality of management agents; and
    merging the one or more specific actions to create the global policy.

10. The method of claim 1, wherein merging the most secure policy from each category of the plurality of categories to create a global policy comprises:
    evaluating the one or more policies from each of the plurality of management agents to create a set of disallowed actions;
    combining each set of disallowed actions to determine one or more specific disallowed actions by each of the plurality of management agents; and
    merging the one or more specific disallowed actions to create the global policy.

11. A computer-readable storage device encoding computer readable instructions for executing a method to manage policies of a mobile device, the method comprising:
    receiving a plurality of policy containers from a plurality of management agents, each of the policy containers having at least one policy;
    associating each policy from each of the plurality of policy containers with one of a plurality of categories;
    determining the most secure policy for each of the plurality of categories, wherein the determination is based on a value associated with each policy;
    merging the most secure policy from each of the plurality of categories to create a global policy; and
    automatically updating the global policy when at least one policy in at least one of the plurality of policy containers and corresponding to a first category of the plurality of categories is updated, further comprising: rolling back each of one or more policies corresponding to the first category, recalculating a security rating for each of the one or more policies, determining which of the one or more policies is the most secure, merging the most secure policy corresponding to the first category with the most secure policies of the plurality of categories that were not updated to create a new global policy, and applying the new global policy to the mobile device.

12. The computer-readable storage device of claim 11 further comprising instructions to automatically update the global policy when a relationship between the mobile device and one of the plurality of management agents has been severed.

13. The computer-readable storage device of claim 12, wherein instructions to automatically update the global policy includes instructions to:
    exclude the policy container and the at least one policy of the one of the plurality of management agents with which the relationship was severed;
    when the most secure policy for at least one of the plurality of categories has been removed as a result of the severed relationship, determine a new most secure policy for the one of the plurality of categories; and
    merge the new most secure policy from the one of the plurality of categories with each remaining category of the plurality of categories to create a new global policy.

14. The computer-readable storage device of claim 11, further comprising instructions for storing, on the mobile device, data corresponding to which of the plurality management agents provided each of the plurality of policy containers.

15. The computer-readable storage device of claim 11, wherein the one or more policies are device wide policies.

16. The computer-readable storage device of claim 11, wherein the one or more policies are data specific policies.

17. The computer-readable storage device of claim 11, wherein determining the most secure policy comprises evaluating a binary rule, wherein an enablement bit of the binary rule determines whether the policy with the enablement bit set is the most secure policy.

18. A system configured to manage policy settings of a mobile device, the system comprising:
    a processor; and
    a memory coupled to the processor, the memory comprising computer-program instructions executable by the processor for:
        receiving a first set of policies from a first management agent, each policy of the first set of policies corresponding to a category;
        receiving a second set of policies from a second management agent, each policy of the second set of policies corresponding to a category;
        determining, for each category having one or more associated policies, a most secure policy, wherein the determination is based on a policy value determined by comparing each policy in each category with all other policies in the same category, wherein the comparison is performed on each policy of each category regardless of which of the plurality of management agents provided the policy;
        merging each most secure policy from each category to create a global policy set, wherein the merging is based on one or more rules from a set of merging rules;
        applying the global policy set to the mobile device when the mobile device connects to the first management agent and applying the global policy set to the mobile device when the mobile device connects to the second management agent; and
        automatically updating the global policy when at least one policy in at least one of the plurality of policy containers and corresponding to a first category of the plurality of categories is removed, further comprising: rolling back each of the one or more remaining policies corresponding to the first category, recalculating a security rating for each of the one or more remaining policies, determining which of the one or more remaining policies is the most secure, merging the most secure policy of the one or more remaining policies with the most secure policies of the categories that were not updated to create a new global policy, and applying the new global policy to the mobile device.

19. The system of claim 18, further comprising identifying each policy in the global policy set that is a data specific policy; and for each identified policy:
  determining whether the identified policy is to be applied to the mobile device when the mobile device connects to both the first management agent and the second management agent;
  determining whether the identified policy is to be applied to the mobile device when the mobile device connects to the first management agent only; and
  determining whether the identified policy is to be applied to the mobile device when the mobile device connects to the second management agent only.

* * * * *